ANALOG TO DIGITAL TO ANALOG CONVERTER, RECORDER AND REPRODUCER

Filed March 20, 1961

INVENTORS
JAY W. RABB
VICTOR F. DOSCH
BY
[signature]
ATTORNEY

United States Patent Office 3,223,991
Patented Dec. 14, 1965

3,223,991

ANALOG TO DIGITAL TO ANALOG CONVERTER, RECORDER AND REPRODUCER

Victor F. Dosch, Ambler, Pa., and Jay W. Rabb, Accokeek, Md., assignors to the United States of America as represented by the Secretary of the Navy Filed Mar. 20, 1961, Ser. No. 97,113
6 Claims. (Cl. 340—347)
(Granted under Title 35, U.S. Code (1952), sec. 266)

Figures 1A, 1B:
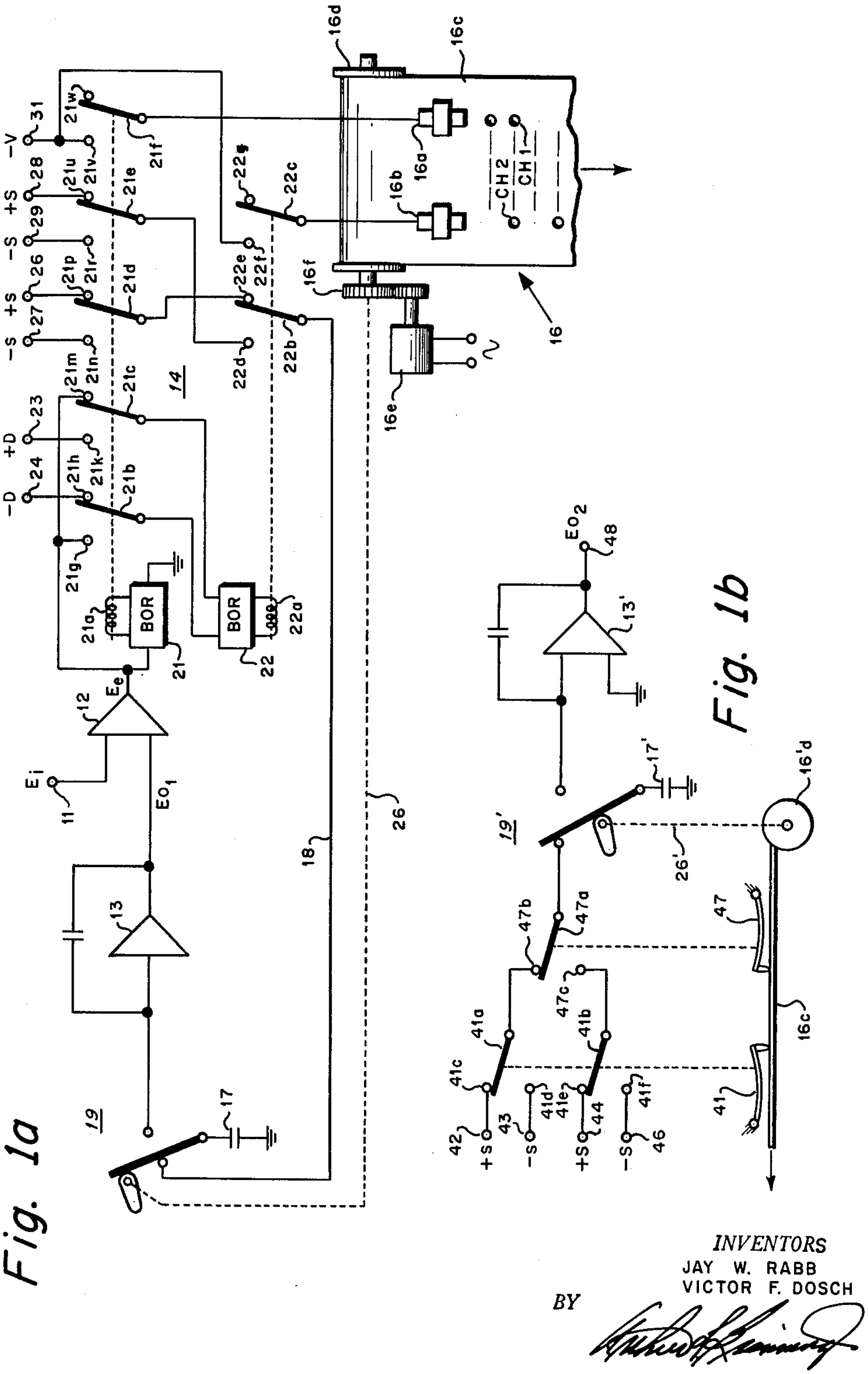

The invention herein described may be manufactured and used by or for the Government of the United States of America for governmental purposes without the payment of any royalties thereon or therefor.

The present invention relates to a recorder-reproducer, and more particularly to an analog-to-digital and a digital-to-analog converter, recorder, and reproducer.

The present invention is directed toward a system operable to record analog functions which, for example, may be in the form of time varying direct voltages, and to accurately and repeatedly reproduce the functions as required at a later time. The system has the feature of being able to store in digital form information fed to it in analog form and at a later time to provide the original analog information from the digital storage.

All other known methods and systems for accomplishing the above purposes require that the analog function be represented artistically in graphical form on paper or other media. In prior art systems, this graph must then be scanned by a stylus or probe (curve follower) or by the electron beam of a cathode ray tube (curve tracer). The curve followers require that a graph be drawn manually to represent the desired function. A mask representing the desired function is required by the curve tracers. In each case, artistic effort which is time consuming and inaccurate is necessary. Further, curve followers usually produce high levels of electrical noise with the reproduced function, while the curve tracers are very expensive, subject to drift, and often inaccurate.

It is therefore a general object of the present invention to provide means to record analog functions in digital form and to accurately and repeatedly reproduce the functions from digital storage as required at a later time.

It is another and more specific object of the present invention to provide an analog-to-digital and a digital-to-analog converter, recorder, and reproducer wherein an analog function may be stored in digital form and may be reproduced from the digital storage when required.

Other objects and many of the attendant advantages of the present invention will become apparent upon consideration of the following detailed description of an embodiment thereof when considered in connection with the accompanying drawings in which:

FIG. 1*a* schematically illustrates the portion of an embodiment of the invention which is operable to store an analog function in digital form; and, FIG. 1*b* illustrates the portion of the embodiment of the invention, partly shown in FIG. 1*a*, which is operable to reproduce the original analog function from the digital storage.

Referring now to FIG. 1*a*, it may be seen that the analog function $E_1$, to be encoded, recorded, and reproduced, is applied to a terminal 11 and from there coupled to one input circuit of a summing amplifier 12. The output signal, $E_{O1}$, from an integrator 13 is coupled to the other input circuit of summing amplifier 12 whereby an error signal $E_e$ which has a value proportional to the difference between $E_1$ and $E_{O1}$ appears in the output circuit thereof and is coupled to a relay logic unit, generally indicated by the reference numeral 14.

Relay logic unit 14 functions to encode the error signal coupled thereto from summing amplifier 12 and to apply the encoded signal to a tape punch unit generally indicated by the reference numeral 16. At the same time relay logic unit 14 further functions to provide a feedback signal to a transfer capacitor 17 via a conductor 18 and the contacts of a cam operated step transfer switch 19. Cam operated switch 19 is periodically actuated in synchronism with the operation of tape punch unit 16 to apply the feedback signal impressed upon transfer capacitor 17 to the input circuit of integrator 13 to thereby close the loop. The circuitry thus far described functions continuously to provide an error signal $E_e$ in the output circuit of amplifier 12 of minimum absolute magnitude whereby at any instant of time the magnitude of $E_{O1}$ is approximately equal to the magnitude of $E_1$.

Referring again to relay logic unit 14, the error signal from summing amplifier 12 is applied to a bias operated relay 21 provided with an operating winding **21*a*, movable contact 21*b* through 21*f*, and stationary contacts 21*g* through 21*w*. The circuitry of bias operated relay 21 is arranged in such a manner that relay operating winding 21*a* is energized only when error voltage $E_e$ is positive or, considering the phase reversal which occurs in amplifier 12, when the magnitude of $E_{O1}$ is negative with respect to $E_1$. The contacts of bias operated relay 21 are shown in the deenergized condition. Stationary contacts 21*g* through 21*w* are respectively coupled to terminals 23, 24, to which are applied positive and negative decision level signals $\mp$D, terminals 26, 27, to which are respectively applied positive and negative small step signals, $\mp s$, terminals 28, 29, to which are respectively applied positive and negative large step signals, $\mp$S, and to a terminal 31 to which is applied a negative operating potential, —V, for tape punching unit 16**.

The input circuits of a second bias operated relay 22 are respectively coupled through movable contacts **21*b*, 21*c*, and stationary contacts 21*g*, 21*h*, 21*k*, 21*m* to the output circuit of summing amplifier 12 and to terminals 23, 24. Bias operated relay 22 includes a relay operating winding 22*a*, a pair of movable contacts 22*b*, 22*c* and stationary contacts 22*d* through 22*g***.

The energizing circuit for a tape puncher **16*a* is coupled to movable contacts 21*f* of bias operated relay 21 while the energizing circuit for a second tape punching unit 16*b* is coupled to movable contact 22*c* of bias operated relay 22. For convenience tape punchers 16*a*, 16*b* are herein respectively referred to as being associated with channel 1 and channel 2 of tape 16*c*. Tape punch unit 16 further comprises a tape reel 16*d* driven by a synchronous motor 16*e* through reduction gearing 16*f***.

The cam actuator of transfer switch 19 is mechanically coupled by a shaft 26 for conjoint rotation with reel **16*d* of tape punching unit 16 whereby transfer capacitor 17 is coupled to integrator once during each coding cycle of tape punching unit 16**.

The mode of operation of the encoding and recording portion of the present invention will now be more fully described.

Assuming that the output of summing amplifier 12, $E_e$, has a small positive magnitude, i.e., $E_{O1}$ has a magnitude less than $E_1$, bias operated relay 21 is energized and the movable contacts thereof are actuated to the position alternate to that shown in FIG. 1*a*. With the contacts in this position, an energizing voltage is coupled from terminal 31 through contacts **21*v*, 21*f* to the energizing circuit of tape puncher 16*a* and a hole will be punched in channel 1 of tape 16*c* as shown. At the same time, the input circuits of bias operated relay 22 have applied thereto the output signal from amplifier 12 and the positive decision level voltage, +D. The circuitry of bias operated relay 22 is arranged in such manner that relay operating winding 22a will be energized only when the absolute magnitude of the error signal $E_e$ exceeds the decision level voltage, $\mp$D. Accordingly, in the present example, bias operated relay 22** is not energized and the contacts thereof remain in the unactuated position shown in FIG. 1*a* and no energizing voltage is applied to tape punching unit 16b. Accordingly, no hole is punched in channel 2 of tape 16c. Continuing with the example, a negative small step signal is coupled from terminal 27 through relay contacts 21n, 21d of bias operated relay 21, contacts 22e, 22b of bias operated relay 22, conductor 18, and the contacts of cam operated switch 19 and applied to transfer capacitor 17. Thereafter rotation of motor 16e advances tape 16c to the next coding position and at the same time functions to rotate the cam actuator of switch 19 whereby transfer capacitor 17 is connected to the input circuit of integrator 13 which thereupon functions to provide a slightly increased output signal (after phase inversion in integrator 13) which when coupled to summing amplifier 12 tends to decrease the error output signal $E_e$.

By way of further example, assume that $E_e$ has a positive magnitude in excess of the decision level voltage, +D. Channel 1 of the tape punching unit functions as above described. However, bias operated relay 22 is now energized and the movable contacts 22b, 22c thereof are actuated to the position alternate to that shown in FIG. 1*a*. Operating potential is thereupon applied from terminal 31 through relay contacts 22f, 22c to tape punching unit 16b. Holes are thereupon punched in both channel 1 and channel 2 of tape 16c. At the same time, a negative large step signal is applied from terminal 29 through contacts 21r, 21e of bias operated relay 21, contacts 21d, 22b of bias operated relay 22, conductor 18, and the contacts of transfer switch 19 and applied to transfer capacitor 17. Upon further operation of tape drive motor 16e, the remainder of the circuitry functions as above described to again reduce the magnitude of the error signal $E_e$ to a minimum.

Operation of the apparatus of FIG. 1*a* on error signals having respectively small and large negative magnitudes is similar to the operation above described. Bias operated relay 21 remains deenergized while bias operated relay 22 likewise remains deenergized when $E_e$ has a small negative magnitude but is energized when $E_e$ has a large negative magnitude. Accordingly, neither channel 1 nor channel 2 has a hole punched therein when $E_e$ has a small negative value and only channel 2 has a hole punched therein when $E_e$ has a large negative value. Thus, at any instant of time the analog $E_i$ is expressed in digital form in terms of a binary code comprising punch or no-punch on two channels of a recording tape and at the input to integrator 13 is approximated by the algebraic sum of the step signals applied to capacitor 17.

Referring now to FIG. 1*b*, which illustrates the digital-to-analog converter and reproducing portion of an embodiment of the invention, there is shown tape 16c wound upon a tape reel 16'd which is mechanically coupled by a shaft 26' to the cam actuator of a step transfer switch 19'. A tape operated finger switch 41 is provided and includes a pair of movable contacts 41a, 41b and stationary contacts 41c through 41f. The stationary contacts of switch 41 are coupled to terminals 42 through 46 to which are respectively applied positive and negative small step signals and positive and negative large step signals corresponding to the step signals applied respectively to terminals 26 through 29 of FIG. 1*a*. There is further provided a second tape operated finger switch 47 provided with a movable contact 47a and a pair of stationary contacts 47b, 47c respectively coupled to movable contacts 41a, 41b of tape operated finger switch 41.

An integrator 13' has an input circuit adapted to be coupled to transfer capacitor 17' and an output circuit coupled to an output terminal 48.

Any suitable utilization means may be coupled to output terminal 48.

While not shown in FIG. 1*b*, it is to be understood that tape reel 16'd is provided with a motor and gear combination similar to motor 16e and gear chain 16f shown in FIG. 1*a* whereby, in the read mode, tape 16c may be translated in the same manner as in the recording mode.

It will be recalled from the above given description of FIG. 1*a* that tape 16c has impressed thereon in channel 1 and channel 2 at each coding position a binary code representing one of $\pm s$ or $\pm S$. It will further be recalled that only when the incremental step signal selected by relay logic unit 14, and impressed upon integrator 13, is negative is a hole punched in channel 1 of tape 16c while in channel 2 a hole is punched only when a large incremental signal, positive or negative, has been selected. Accordingly, switch contacts 41a, 41b remain in the unactuated position shown in FIG. 1*b* when the coding of the tape corresponds to a positive incremental signal and are depressed to the alternate position when the coding of tape 16c corresponds to a negative signal. In a similar manner, finger switch contact 47a remains in the unactuated position shown when the coding of the tape corresponds to a small step signal and is actuated to the alternate position when the coding of the tape corresponds to a large incremental signal. Thus, the magnitude and polarity of the incremental signal coupled through the contacts of finger switches 41, 47 and step transfer switch 19' and applied to transfer capacitor 17' at each coding position of the punched tape corresponds to the incremental step signal selected by relay logic unit 14 for that coding position of the tape during the recording process. The potential appearing on capacitor 17' is coupled to integrator 13' during each cycle of the decoding operation. Accordingly, there appears at output terminal 48 an analog function $E_{O2}$ which is a faithful reproduction of the original analog function $E_i$.

There has been above described an embodiment of the invention which functions to record in binary form an analog function and to decode and reproduce the original analog function whenever desired.

Essentially the process comprises obtaining and recording the derivative of a function, integrating the derivative to obtain the original function, and comparing the integral with the original function to obtain a new derivative for recordation and further processing.

Obviously, many modifications and variations of the present invention are possible in the light of the above teachings. For example, a magnetic recording media may be utilized in place of the punched tape system described. It is therefore to be understood that, within the scope of the appended claims, the invention may be practiced otherwise than as specifically described.

What is claimed is:

1. A recorder-reproducer comprising: summing means having an output circuit and a pair of input circuits, an input terminal adapted to be coupled to a source of a signal representing an analog function, circuit means coupling one of the input circuits of said summing means to said input terminal, a relay logic unit coupled to the output circuit of said summing means operable to select one of a positive small step signal, a negative small step signal, a positive large step signal, or a negative large step signal depending upon the magnitude and direction of the change in the signal appearing in the output circuit of said summing means during a selected period of time, first integrating means having an input circuit and an output circuit coupled to the other input circuit of said summing means, periodically operable means coupled to apply said selected step signal to the input circuit of said first integrating means, a recording media, means coupled to said relay logic unit operable to impress said selected step signal upon said recording media during said selected period of time, output terminal means, second integrating means having an input circuit and an output circuit coupled to said output terminal means, and means coupled to the input circuit of said second integrating means operable to extract said selected step signal from said recording media.

2. The combination of claim 1 in which said recording media comprises a two channel punched tape and in which said means to impress said selected step signal upon said recording media comprises a first tape punching unit associated with one channel of said tape and coupled to said relay logic unit to be energized when a positive step signal is selected, and a second tape punching unit associated with the other channel of said tape and coupled to said relay logic unit to be energized when a large step signal is selected.

3. The combination of claim 2 in which said means to extract said selected step signal from said recording media comprises a first finger operated switch having the actuator thereof in engagement with one channel of said tape and including a first movable contact operable to engage one of a first pair of stationary contacts having respectively applied thereto a positive small step signal and a negative small step signal, and a second movable contact operable to engage one of a second pair of stationary contacts having respectively applied thereto a positive large step signal and a negative large step signal, and a second finger operated switch having the actuator thereof in engagement with the other channel of said punched tape and including a movable contact operable to engage one of a pair of stationary contacts respectively coupled to the movable contacts of said first finger operated switch.

4. In a recorder-reproducer, means comprising: summing means having an output circuit and a pair of input circuits, an input terminal adapted to be coupled to a source of a signal representing an analog function, circuit means coupling one of the input circuits of said summing means to said input terminal, a relay logic unit coupled to the output circuit of said summing means operable to select one of a positive small step signal, a negative small step signal, a positive large step signal, or a negative large step signal depending upon the magnitude and direction of the change in the signal appearing in the output circuit of said summing means during a selected period of time, integrating means comprising an input circuit of said summing means, periodically operable means coupled to apply said selected step signal to the input circuit of said integrating means, a recording media, and means coupled to said relay logic unit operable to impress said selected step signal upon said recording media.

5. The combination of claim 4 in which said recording media comprises a two channel punched tape and in which said means to impress said selected step signal upon said recording media comprises a first tape punching unit associated with one channel of said tape and coupled to said relay logic unit to be energized when a positive step signal is selected, and a second tape punching unit associated with the other channel of said tape and coupled to said relay logic unit to be energized when a large step signal is selected.

6. Means to reproduce an analog function impressed in binary form on a two channel punched tape comprising: a first finger operated switch having the actuator thereof in engagement with one channel of said tape and including a first movable contact operable to engage one of a first pair of stationary contacts having respectively applied thereto a positive small step signal and a negative small step signal, and a second movable contact operable to engage one of a second pair of stationary contacts having respectively applied thereto a positive large step signal and a negative large step signal, a second finger operated switch having the actuator thereof in engagement with the other channel of said punched tape and including a movable contact operable to engage one of a pair of stationary contacts respectively coupled to the movable contacts of said first finger operated switch, output terminal means, integrating means having an input circuit and an output circuit coupled to said output terminal means, and means to periodically couple the input circuit of said integrating means to the movable contact of said second finger operated switch.

References Cited by the Examiner

UNITED STATES PATENTS

| | | | |
|---|---|---|---|
| 2,801,351 | 7/1957 | Calvert | 235—181 |
| 2,836,356 | 5/1958 | Forrest et al. | 235—61 |
| 2,865,564 | 12/1958 | Kaiser et al. | 235—61 |
| 2,872,996 | 2/1959 | Runge | 235—181 X |
| 2,972,733 | 2/1961 | Bucy | 235—181 X |
| 3,119,992 | 1/1964 | Fluegel | 340—347 |
| 3,159,741 | 12/1964 | Dahlin | 235—183 |

ROBERT C. BAILEY, *Primary Examiner.*

IRVING L. SRAGOW, MALCOLM A. MORRISON, *Examiners.*